US012003026B2

(12) United States Patent
Jaeger

(10) Patent No.: US 12,003,026 B2
(45) Date of Patent: Jun. 4, 2024

(54) ANTENNA DEVICE AND VEHICLE COMPRISING AN ANTENNA DEVICE

(71) Applicant: Continental Automotive GmbH, Hannover (DE)

(72) Inventor: Klaus Jaeger, Berlin (DE)

(73) Assignee: Continental Automotive GmbH, Hannover (DE)

(*) Notice: Subject to any disclaimer, the term of this patent is extended or adjusted under 35 U.S.C. 154(b) by 162 days.

(21) Appl. No.: 17/761,015

(22) PCT Filed: Sep. 14, 2020

(86) PCT No.: PCT/EP2020/075596
§ 371 (c)(1),
(2) Date: Mar. 16, 2022

(87) PCT Pub. No.: WO2021/052897
PCT Pub. Date: Mar. 25, 2021

(65) Prior Publication Data

US 2022/0352641 A1 Nov. 3, 2022

(30) Foreign Application Priority Data

Sep. 17, 2019 (DE) ..................... 10 2019 214 124.2

(51) Int. Cl.
*H01Q 15/00* (2006.01)
*H01Q 1/32* (2006.01)
*H01Q 1/52* (2006.01)

(52) U.S. Cl.
CPC .......... *H01Q 15/008* (2013.01); *H01Q 1/521* (2013.01); *H01Q 1/32* (2013.01)

(58) Field of Classification Search
CPC ......... H01Q 15/008; H01Q 1/521; H01Q 1/32
See application file for complete search history.

(56) References Cited

U.S. PATENT DOCUMENTS

| | | | |
|---|---|---|---|
| 7,760,140 | B2 | 7/2010 | Kamgaing |
| 8,081,117 | B2 | 12/2011 | Nagai et al. |
| 2007/0285336 | A1 | 12/2007 | Kamgaing |
| 2009/0153433 | A1 | 6/2009 | Nagai et al. |

(Continued)

FOREIGN PATENT DOCUMENTS

CA 2936482 A1 1/2018

OTHER PUBLICATIONS

Hongchan Kim et al. "Design and implementation of electromagnetic band-gap embedded antenna for vehicle-to-everything communications in vehicular systems", ETRI Journal, Aug. 1, 2019, ISSN: 1225-6463, pp. 731-738.

(Continued)

*Primary Examiner* — Daniel D Chang

(57) ABSTRACT

Disclosed is an antenna device comprising at least two antennas, designed for transmitting and/or receiving electromagnetic waves, and a circuit board device, wherein the antennas are arranged on the same circuit board device, the circuit board device comprises at least one decoupling layer through which a parasitic coupling of the antennas is reduced. The circuit board device comprises at least one upper substrate layer on which at least one metal strip with predetermined dimensions is arranged, wherein the metal strip is separated from the at least one decoupling layer by at least one upper substrate layer.

16 Claims, 4 Drawing Sheets

(56) References Cited

U.S. PATENT DOCUMENTS

| | | | | |
|---|---|---|---|---|
| 2010/0001080 | A1 | 1/2010 | Sim et al. | |
| 2010/0265159 | A1* | 10/2010 | Ando | H05K 1/0236 343/913 |
| 2017/0365931 | A1* | 12/2017 | Martel | H01Q 15/0086 |

OTHER PUBLICATIONS

Nagendra Kushwaha et al. "Study of Different Shape Electromagnetic Band Gap (EBG) Structures for Single and Dual Band Applications", Journal of Microwaves, Optoelectronics and Electromagnetic Applications, Jun. 2014, vol. 13, No. 1.

Jesper Thaysen et al. "Design considerations for low antenna correlation and mutual coupling reduction in multi antenna terminals", European Transactions on Telecommunications, Mar. 18, 2007 vol. 18, Issue 3.

Office Action dated Jul. 30, 2020 from corresponding German patent application No. 10 2019 214 124.2.

International Search Report and Written Opinion dated Nov. 17, 2020 from corresponding International patent application No. PCT/EP2020/075596.

* cited by examiner

ANTENNA DEVICE AND VEHICLE COMPRISING AN ANTENNA DEVICE

The invention relates to an antenna device and a vehicle that comprises at least one antenna device.

To reduce the dimensions of antenna devices, the arrangement of multiple antennas on one side of a circuit board device is widespread. The antennas can, for example, be monopole antennas or patch antennas. The antennas can transmit and/or receive respective electromagnetic waves during operation. A portion of the respective electromagnetic waves is, as is desired, radiated into the surroundings. In the case, in particular, of antennas on circuit boards that comprise dielectric substrate layers and conductive layers, a part of the electromagnetic waves is guided along boundary surfaces as surface waves or volume waves, along or within the circuit board. Unwanted parasitic couplings consequently develop between the antennas. This coupling generally has a negative effect on the antenna performance, and impairs the signal-to-noise ratio and/or the possible transmission rates in the case of multiple-in/multiple-out (MIMO) transmission methods, as is applied in the case of the current 5G mobile telephone technology.

To reduce these parasitic couplings, it is for example possible to increase the distances between antennas, although this is only possible to a limited extent in the case of MIMO antennas in motor vehicles or in mobile terminals due to the geometrical restrictions on the dimensions.

One possibility for reducing parasitic couplings consists in the use of electromagnetic bandgap structures. These are structures that exhibit an increased impedance in specific frequency ranges. Electromagnetic waves in this frequency range can thus be attenuated, whereby the coupling between the antennas is reduced.

The frequency range depends on the inductances and capacitances of the electromagnetic bandgap structures. These must consequently be selected such that they are matched to the frequency range that is to be attenuated. According to the prior art this is achieved through the design of individual elements of the bandgap structure. This, however, gives rise to the problem that a respective bandgap structure must be provided for a respective frequency range.

A design of electromagnetic bandgap structures is, for example, examined in the following scientific publications:

KUSHWAHA, Nagendra; KUMAR, Raj. Study of different shape electromagnetic band gap (EBG) structures for single and dual band applications. Journal of Microwaves, Optoelectronics and Electromagnetic Applications, 2014, vol. 13, no. 1, pp. 16-30.

THAYSEN, Jesper; JAKOBSEN, Kaj B. Design considerations for low antenna correlation and mutual coupling reduction in multi antenna terminals. European transactions on telecommunications, 2007, vol. 18, no. 3, pp. 319-326.

The following bandgap structures are known from the prior art:

U.S. Pat. No. 7,760,140 B2 describes a multiband antenna arrangement with electromagnetic bandgap structures. The multiband antenna arrangement comprises two or more planar antennas that are arranged on a surface of a substrate, and a first set of electromagnetic bandgap cells that are located between and on the surface with the antennas, along with a second set of electromagnetic bandgap cells that are located inside the substrate, underneath the antennas.

CA 2 936 482 A1 describes an electromagnetic bandgap structure. The electromagnetic bandgap structure is formed by a co-planar waveguide with inductors and capacitors that are selected such that they bring about a frequency-dependent coupling between a parallel plate waveguide mode and a coplanar waveguide mode to create an electromagnetic bandgap.

It is thus an object of the invention to bring about a shift of a frequency range of an electromagnetic bandgap structure without changing the shape of the elements of the electromagnetic bandgap structure.

The object is achieved by the subjects of the independent patent claims. Advantageous refinements of the invention emerge from the features of the dependent patent claims, from the following description and from the figures.

The invention relates to an antenna device. The antenna device comprises at least two antennas that are configured to transmit and/or to receive electromagnetic waves. The antenna device comprises a circuit board device in which the antennas are arranged on the same circuit board device. The circuit board device can comprise at least one circuit board on which integrated circuits or components can be arranged for operation of the antennas. The circuit board device can comprise multiple layers stacked on top of one another. The layers can, for example, comprise substrate layers of a dielectric material or conductive layers of an electrically conductive material. It is provided that the circuit board device comprises at least one decoupling layer through which a parasitic coupling of the antennas is reduced. In other words, at least one layer is arranged in the circuit board device that reduces a parasitic coupling that arises between the antennas as a result of the electromagnetic waves. It can be provided that the decoupling layer has a raised impedance in a predetermined frequency range. A surface component of the electromagnetic wave that runs along the circuit board device can thereby be reduced in the predetermined frequency range. The circuit board device comprises at least one upper substrate layer on which at least one metal strip with predetermined dimensions is arranged. In other words, the circuit board device comprises at least one layer of a dielectric substrate, while the at least one metal strip is arranged in the substrate layer or on a surface of the substrate layer. The metal strip is separated from the at least one decoupling layer by the at least one upper substrate layer. It can, for example, be provided that the upper substrate layer is arranged with one side on the decoupling layer. The at least one metal strip can be arranged on the other side of the substrate layer. The metal strip can, for example, be a metal foil, or a region of the substrate layer onto which a metal is applied. The metal strip can be dimensioned in such a way that a frequency range of a decoupling of the two antennas as a result of the decoupling layer is shifted into a lower frequency range. In other words, the metal strip is dimensioned in such a way that the frequency range that exhibits a heightened impedance is shifted.

The invention gives rise to the advantage that the frequency range in which the heightened impedance occurs can be shifted without changing the decoupling layer.

The invention also includes optional further developments through which further advantages arise.

A further development of the invention provides that the decoupling layer comprises a high-impedance structure. In other words, the decoupling layer comprises at least one regular arrangement of metal surfaces in at least one electrically conductive layer, wherein the respective metal surfaces are electrically conductively connected to a ground layer through a substrate layer by means of respective connecting elements aligned normally to the metal surfaces. In other words, at least one substrate layer of the antenna device comprises the ground layer on one side. The regular arrangement of the metal surfaces is located on a side of the substrate layer opposite to the ground layer, wherein the respective metal surfaces are electrically conductively connected to the ground layer via the respective connecting elements that pass through the substrate layer. The metal surfaces here, interacting with the ground layer, can provide an electrical capacitance. The connecting elements can provide predetermined inductances. This gives rise to the advantage that it is possible, by specifying a predetermined resonance and a predetermined inductance, to provide a resonance with a predetermined frequency. The frequency can be chosen in such a way that it corresponds to a frequency of a surface wave or volume wave that is to be suppressed.

It can, for example, be provided that by specifying a surface area of the metal surfaces, selecting a substrate material of the substrate layer with a predetermined dielectric constant, and selecting a predetermined spacing between the metal surfaces from the ground layer, a capacitance of the elements of the high-impedance structure is specified. An inductance of the elements of the high-impedance structure can be specified through a selection of the dimensions of the connecting elements. The high-impedance structure can, for example, be what is known as a mushroom-like electromagnetic bandgap structure. Parasitic couplings that exhibit the predetermined resonant frequency can reduce a propagation of the parasitic couplings due to a raised impedance of the structures in the resonant frequency range. An advantage that results from the invention is that, by fixing predetermined resonant frequencies by means of the high-impedance structure, a propagation of parasitic couplings at the predetermined resonant frequencies can be reduced. It can, for example, be provided that the high-impedance structure has at least one resonant frequency that lies in a frequency spectrum of one of the antennas.

A further development of the invention provides that the decoupling layer comprises an incomplete floor structure. In other words, the decoupling layer comprises a conductive surface connected to a ground potential, wherein the conductive surface has periodic incomplete regions along at least one planar direction in the surface, at which regions of the conductive material are removed. It can, for example, be a layer of copper with periodic holes that can be connected to a ground potential. Such a structure is, for example, known as a planar electromagnetic bandgap structure.

A further development of the invention provides that the at least one metal strip is aligned with a longitudinal direction toward the at least two antennas. In other words, the metal strip is arranged on the upper substrate layer in such a way that the longitudinal direction of the metal strip extends parallel to a connecting line between the two antennas. It can, for example, be provided that the metal strip has a length that is greater than a width. The longitudinal direction of the length can here be aligned parallel to a connecting line between the two antennas. This gives rise to the advantage that the metal strip is aligned in a direction of the maximum intensity of the surface waves.

The invention also comprises a motor vehicle having at least one antenna device.

The invention also includes developments of the motor vehicle according to the invention which have features as have already been described in connection with the developments of the antenna device according to the invention. For this reason, the corresponding further developments of the motor vehicle according to the invention are not described here again.

The invention also encompasses the combinations of the features of the described embodiments.

An exemplary embodiment of the invention is described below. In this respect:

The exemplary embodiment explained below is a preferred embodiment of the invention. In the exemplary embodiment, the described components of the embodiment each represent individual features of the invention that should be considered independently of one another, and that each also develop the invention independently of one another and can therefore also be considered to be part of the invention individually or in a combination other than that shown. Furthermore, the embodiment described can also be supplemented by further features of the invention that have already been described.

In the figures, elements with the same function are each provided with the same reference signs.

Figure 1:
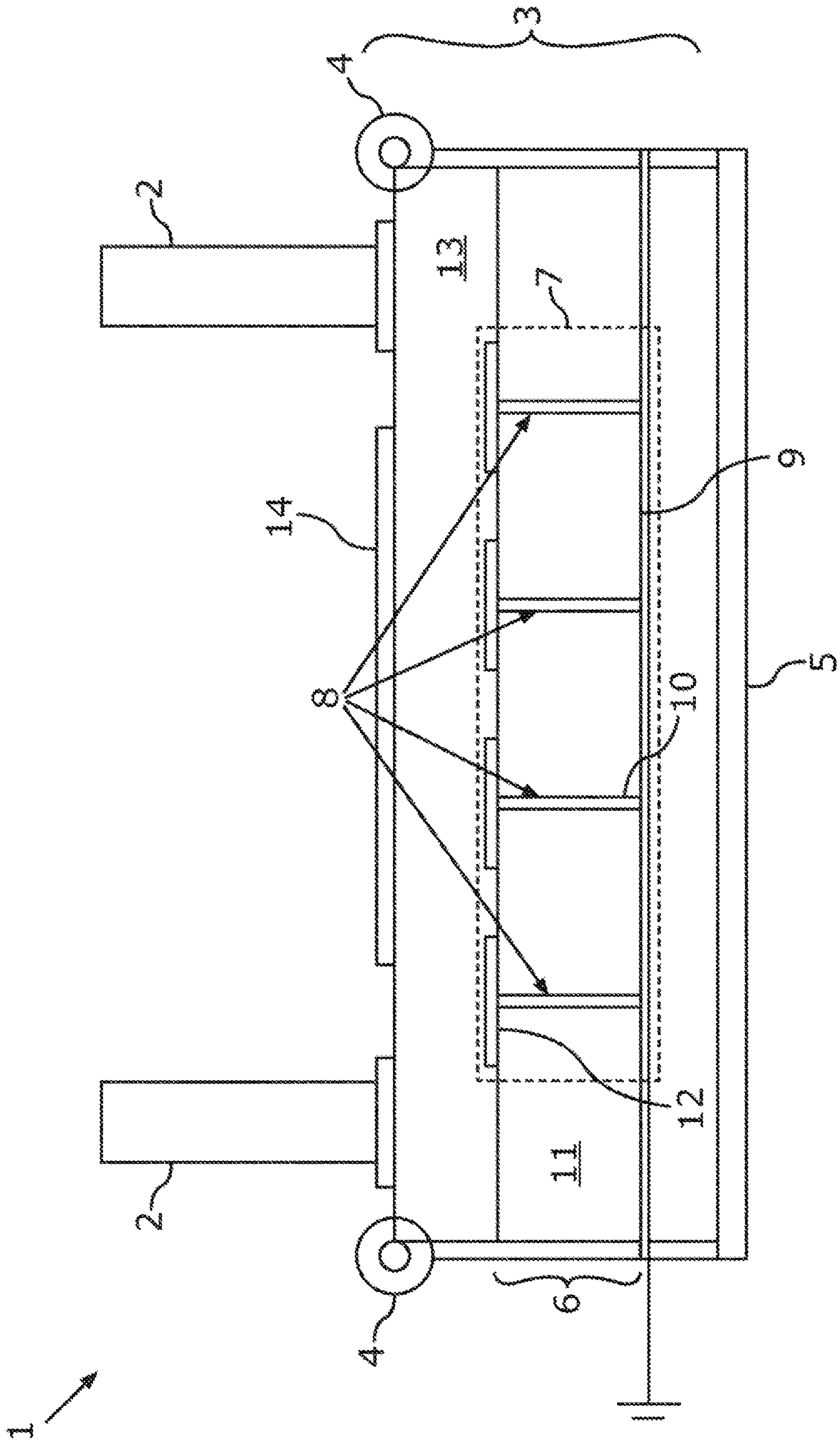
FIG. 1 shows an antenna device.

FIG. 1 shows an antenna device. The antenna device 1 can comprise at least two antennas 2 that can be arranged on one side of the circuit board device 3 of the antenna device 1 and that can have a distance from one another. The antennas 2 can, for example, be monopole antennas that can be connected to a respective antenna terminal 4. It can be provided that the antennas 2 are fed through the respective antenna terminal 4 in order to transmit electromagnetic waves in a respective frequency spectrum. It can be provided that the frequency spectra of the two antennas 2 overlap or are identical. The two antennas 2 can be controlled by an integrated circuit 5 that can be arranged on the same circuit board device 3 as the antennas 2.

The circuit board device 3 can comprise a decoupling layer 6. The decoupling layer can be provided for the purpose of reducing an electromagnetic coupling of the two antennas 2 by parasitic waves. The parasitic waves can, for example, be surface components of the electromagnetic waves radiated by the antennas 2, that are guided along the circuit board device 3. The decoupling layer 6 can comprise a high-impedance structure 7. The high impedance structure 7 can have a periodic arrangement of high-impedance elements 8. It can be provided that the high-impedance elements 8 can be what are known as mushroom structures. The high-impedance elements 8 can be arranged on a ground layer 9 of the decoupling layer 6. The high-impedance elements 8 can comprise a respective connecting element 10 that can be arranged in a substrate layer 11 of the decoupling layer 6 in order to connect a metal surface 12 arranged parallel to the ground layer 9 on the substrate layer 11. The dimensions of the high-impedance elements 8 and a material of the substrate layer 11 can be chosen in such a way that a respective high-impedance element 8 can exhibit a predetermined capacitance and a predetermined inductance. Resonances can occur in the decoupling layer 6 at specific frequencies as a result. At these frequencies, the decoupling layer 6 can exhibit higher impedances, whereby the ability of the parasitic waves to propagate is reduced. The frequencies are to be chosen in the frequency range of the electromagnetic waves that are to be suppressed.

At least one upper substrate layer 13 can be arranged on the decoupling layer 6. The substrate layer 13 can consist of a dielectric material. At least one metal strip 14 can be arranged on the substrate layer 13. The metal strip 14 can, for example, be a foil glued to the substrate layer 13, or a region that is coated with metal. The metal strip 14 can be arranged between the antennas 2. The at least one metal strip 14 and the upper substrate layer 13 can have dimensions that can shift a frequency range of the decoupling layer 6 into a lower frequency region.

Figure 2:
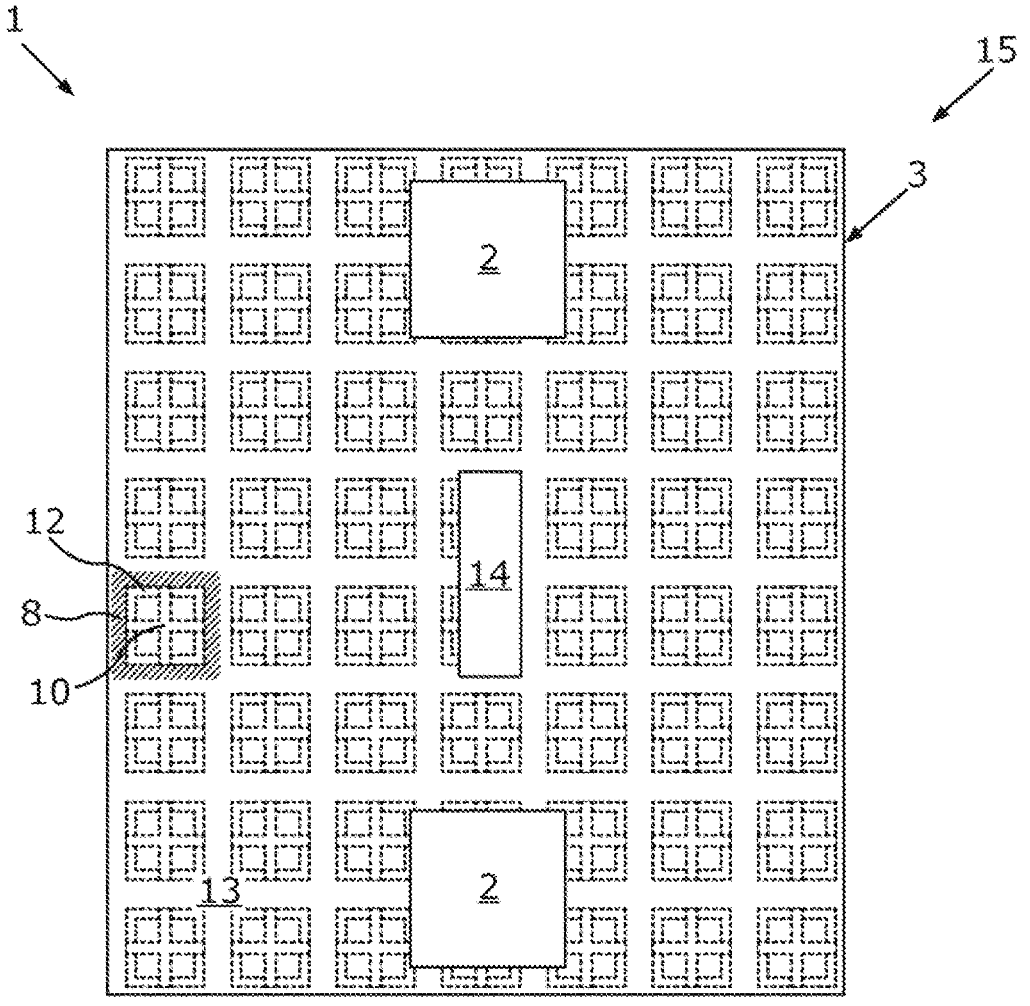
FIG. 2 shows a plan view of the antenna device.

FIG. 2 shows a plan view of the antenna device 1. The antenna device can comprise at least two antennas 2. The metal strip 14 can be arranged on the upper substrate layer 13 between the antennas 2. The decoupling layer 6, which can comprise the high-impedance structure 7, can be arranged under the upper substrate layer 13. The high-impedance elements 8 of the high-impedance structure 7 can be arranged periodically. The metal surfaces of the high-impedance elements 8 can have a predetermined shape, for example that of a swastika, a cross or a rectangle. The metal surfaces of the high-impedance elements 8 can have dimensions of 4.8 mm*4.8 mm*0.8 mm. The width of the metal strip can be 2.3 mm. The upper substrate layer 13 can have a thickness of 1.3 mm. The antenna device 1 can, for example, be arranged in a motor vehicle 15.

Figure 3:
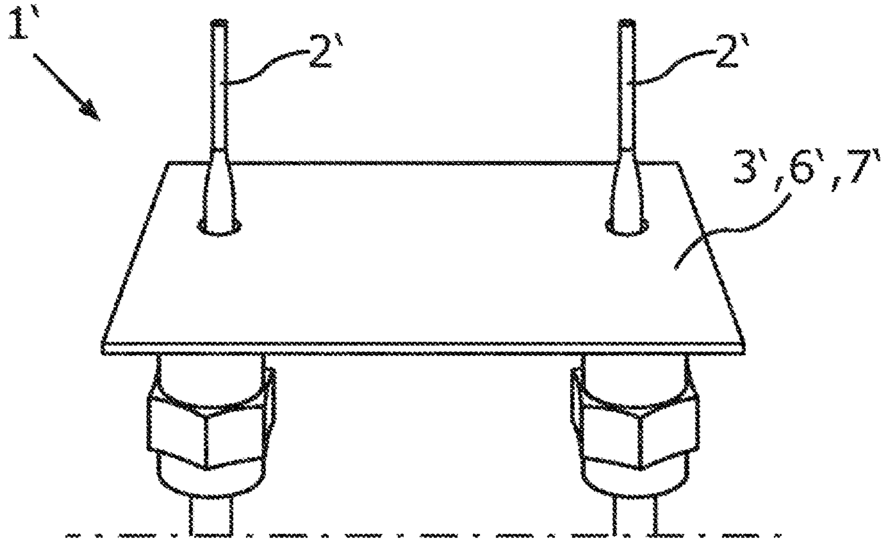
FIG. 3 shows an antenna device without a metal strip.

FIG. 3 shows an antenna device 1', wherein the circuit board device 3' can comprise the decoupling layer 6' with the high-impedance structure 7'. The antenna device 1' does not have any metal strips 14' between the two antennas 2'. The antennas 2' can be monopole antennas.

Figure 4:
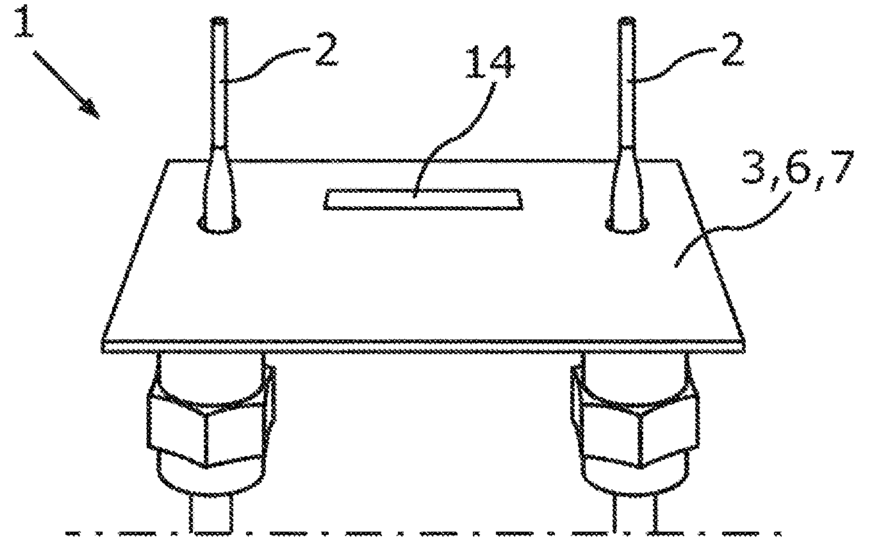
FIG. 4 shows the antenna device with a metal strip.

FIG. 4 shows the antenna device 1. The antenna device can be in accord with the antenna device 1' in FIG. 3, wherein the antenna device 1, in contrast to the antenna device 1, can comprise the metal strip 14 between the two antennas 2. The metal strip can comprise copper, and can have dimensions of 16 mm by 3.7 mm.

Figure 5:
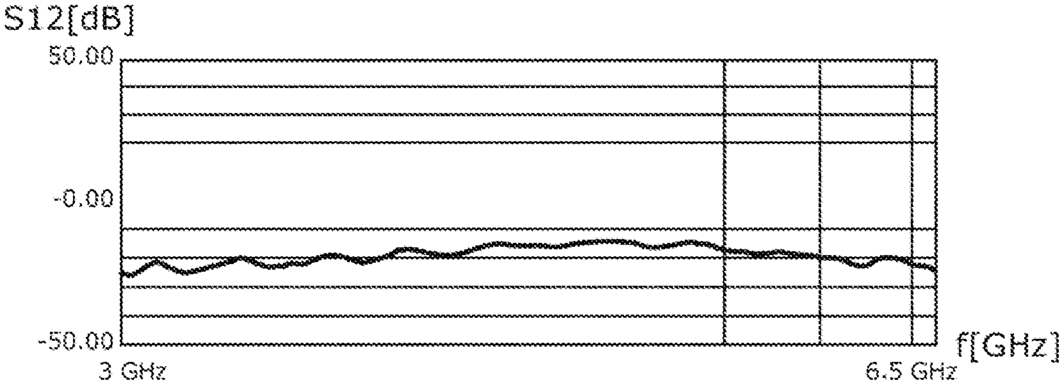
FIG. 5 shows a profile of the S12 parameter for antennas of an antenna device.

FIG. 5 shows a profile of the S12 parameters for antennas 2' of an antenna device 1', the circuit board device 3' of which comprises neither the decoupling layer 6' with the high-impedance structure 7', nor the metal strip 14'. The S21 parameters can describe the transmission of an electromagnetic wave from one of the antennas 2' to another of the antennas 2'. The S12 parameter is plotted against the frequency f. The curve shows a relatively constant profile over all frequencies f.

Figure 6:
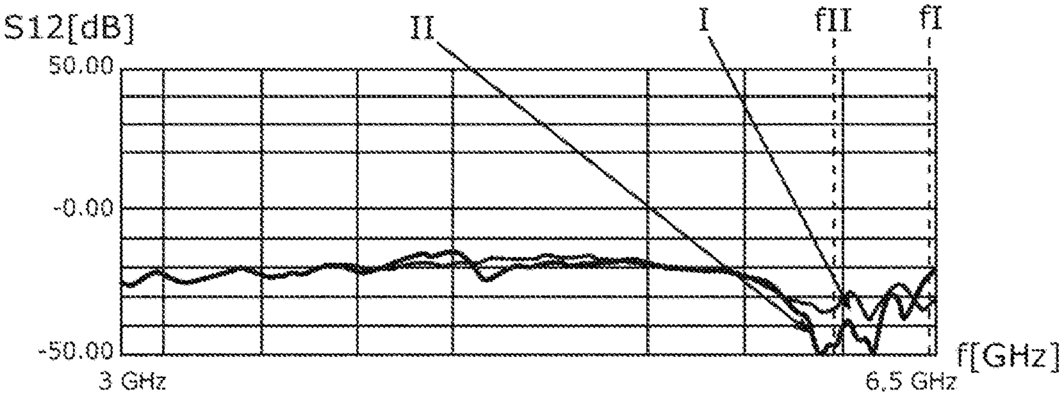
FIG. 6 shows a comparison between two curves of the S12 parameter.

FIG. 6 shows a comparison between two curves of the S12 parameter. Curve I shows the profile of the S12 parameter of the antenna device 1' of FIG. 3. This comprises the decoupling layer 6', but not a metal strip. Curve II shows the curve of the S12 parameter of the antenna device 1 of FIG. 4. This antenna device 1 comprises the decoupling layer 6 and the metal strip 14. Both curves I, II show a characteristic frequency range fI, fII with low values of the S12 parameter. The profile of the curve II has a similar shape. The drop is nevertheless more marked, and is shifted by about 0.5 GHz toward lower frequencies.

Overall, the example shows how the invention makes it possible to influence the frequency range of a decoupling layer.

The invention claimed is:

1. An antenna device, comprising:
at least two antennas designed for transmitting and/or receiving electromagnetic waves, and
a circuit board device, wherein the antennas are arranged on the same circuit board device,
the circuit board arrangement comprises at least one decoupling layer through which a parasitic coupling of the antennas is reduced,
wherein the circuit board device comprises at least one upper substrate layer on which at least one metal strip with predetermined dimensions is arranged,
wherein the metal strip is separated from the at least one decoupling layer by the at least one upper substrate layer, and
wherein the at least one decoupling layer comprises a conductive surface connected to a ground potential, wherein the conductive surface has periodic incomplete regions.

2. The antenna device as claimed in claim 1,
wherein the at least one decoupling layer comprises a high-impedance structure.

3. The antenna device as claimed in claim 1,
wherein the at least one decoupling layer is layer of copper with periodic holes.

4. The antenna device as claimed in claim 1,
wherein the at least one metal strip is aligned toward a longitudinal direction to the at least two antennas.

5. A motor vehicle with at least one antenna device as claimed in claim 1.

6. The antenna device as claimed in claim 1, wherein
the at least one decoupling layer comprises a high-impedance structure; and
the at least one decoupling layer comprises an incomplete floor structure; and
the at least one metal strip is aligned toward a longitudinal direction to the at least two antennas.

7. A motor vehicle with at least one antenna device as claimed in claim 6.

8. A motor vehicle with at least one antenna device as claimed in claim 2.

9. The antenna device as claimed in claim 2,
wherein the at least one decoupling layer comprises an incomplete floor structure.

10. A motor vehicle with at least one antenna device as claimed in claim 9.

11. The antenna device as claimed in claim 9,
wherein the at least one metal strip is aligned toward a longitudinal direction to the at least two antennas.

12. A motor vehicle with at least one antenna device as claimed in claim 11.

13. The antenna device as claimed in claim 3,
wherein the at least one metal strip is aligned toward a longitudinal direction to the at least two antennas.

14. A motor vehicle with at least one antenna device as claimed in claim 13.

15. A motor vehicle with at least one antenna device as claimed in claim 3.

16. A motor vehicle with at least one antenna device as claimed in claim 4.

* * * * *